Sept. 18, 1951

J. G. CATRANIS 2,568,052

CONTROL VALVE

Filed Oct. 17, 1947

INVENTOR:
John G. Catranis,
BY
Bodell & Thompson
ATTORNEYS.

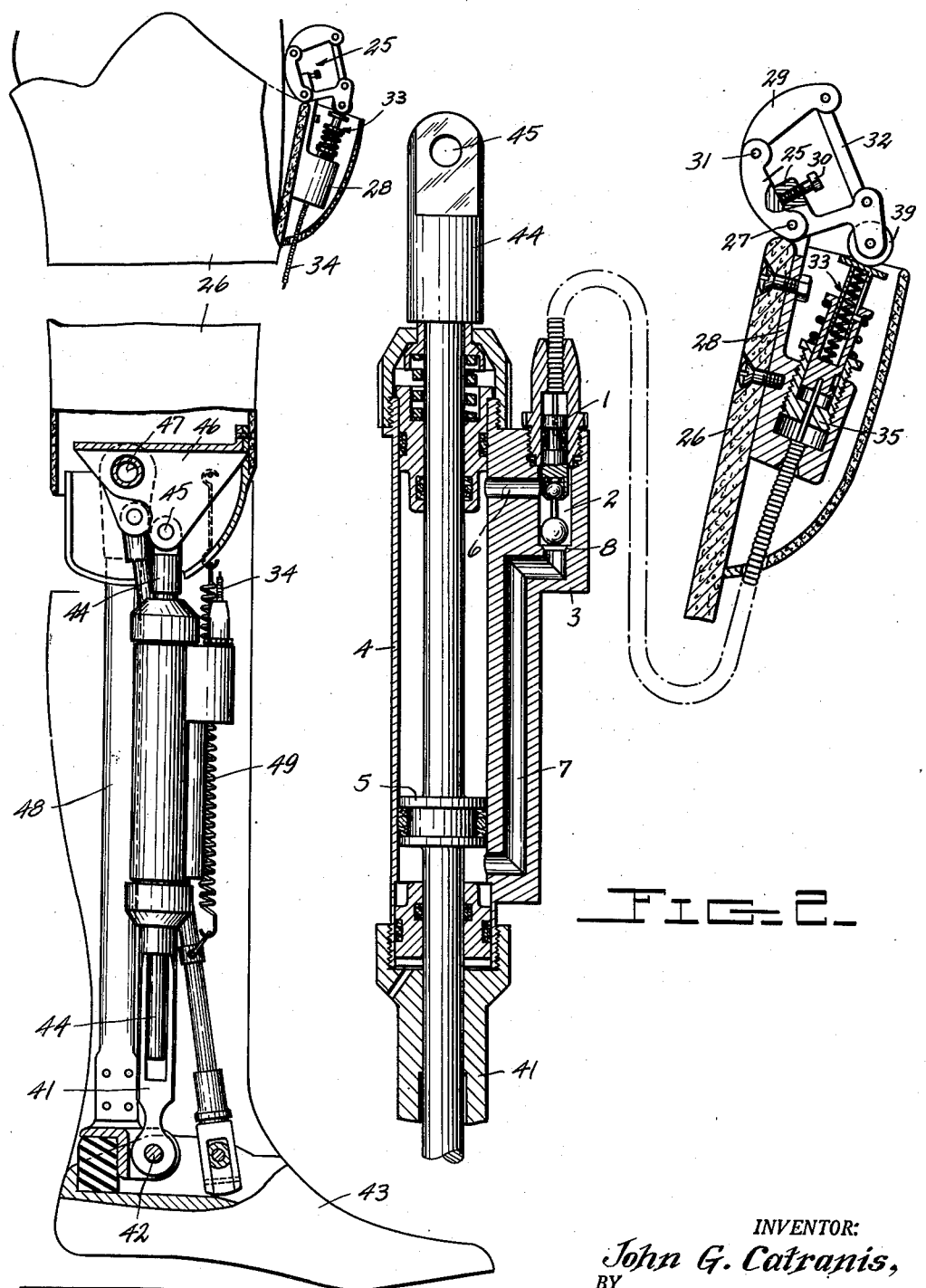

Patented Sept. 18, 1951

2,568,052

UNITED STATES PATENT OFFICE 2,568,052

CONTROL VALVE

John G. Catranis, Syracuse, N. Y.

Application October 17, 1947, Serial No. 780,363

1 Claim. (Cl. 137—139)

This invention relates to valves, and has for its object a valve having opposing balanced pressure faces presented to the fluid in the valve chamber when the valve is closed by an operating mechanism including resilient yielding means, and an unbalancing face presented to the pressure in the chamber when the valve is closed to receive pressure to open the valve against the yielding closing force and hence, tending to open the valve when the pressure in the chamber against the unbalancing face is greater than the pressure of the operating force through the yielding means, so that during the application of the closing or operating force, the valve has a throttling or fluctuating opening and closing movement until the operating force overcomes the unbalancing pressure.

The valve is here illustrated as embodied in a hydraulic knee lock or brake for artificial legs for above-the-knee amputees to control the flow of hydraulic fluid through a by-pass from one end of the brake cylinder of the hydraulic knee lock, to the other end around the piston in the cylinder, and as controlled by a prime mover actuated by the tensioning and relaxation of the thigh muscles of the stump of the amputee, the motion of the prime mover being transmitted to the valve to operate it through motion transmitting means including a spring, or springs, which have a yielding movement and hence permit the valve to open under an unbalancing or unseating pressure in the valve chamber until the yielding means or spring is loaded by the prime mover under the increased tensioning of the thigh muscles, to an extent that the closing force is greater than the unbalancing pressure in the valve chamber. The artificial leg, knee lock and control per se form no part of this invention but constitutes the subject matter of my application, Ser. No. 779,011 filed October 10, 1947.

The invention consists in the novel features and in the combinations and constructions hereinafter set forth and claimed.

In describing this invention, reference is had to the accompanying drawings in which like characters designate corresponding parts in all the views.

Figure 1 is an elevation, partly broken away and partly in section, of an artificial leg knee lock or brake and control embodying this valve.

Figure 2 is an enlarged, sectional view of the knee lock or its hydraulic system and control showing the valve in its starting or open position.

Figures 3, 4, 5:
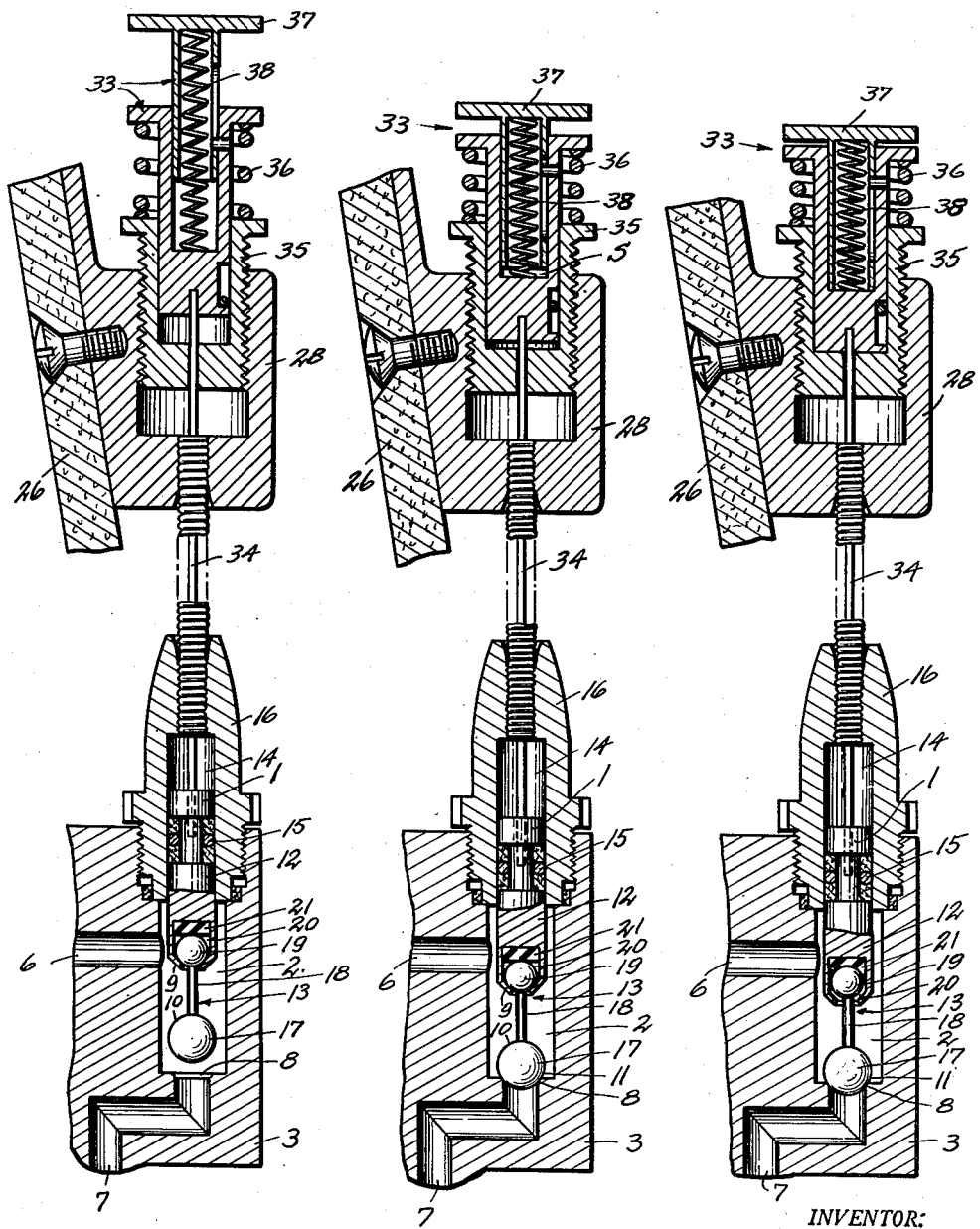

Figures 3, 4 and 5 are respectively enlarged sectional views of the valve and yielding operating means and control showing the valve in its starting open position, in its closed position with the spring of the operating means partly compressed or loaded and of less force than the unbalancing pressure of the fluid in the valve chamber on the valve, and when in its firmly closed position under the nearly full tensioning of the thigh muscles, the prime mover having been actuated far enough so that the unbalancing force of the fluid in the valve chamber on the closed valve is overruled.

The numeral 1 designates a valve reciprocally movable in a valve chamber 2 formed in a casing 3 which is shown as a block on the side of the cylinder 4 of a hydraulic knee lock or brake of an artificial leg, the block being formed with a by-pass from one end, as the upper end of the cylinder 4, to the other or lower end around the piston 5 working in the cylinder. The valve chamber 2 intersects or is an enlargement of the by-pass.

A leg 6 of the by-pass extends between the upper end of the cylinder into the chamber 2 through one side thereof, and the other leg 7 extends between the lower end of the cylinder and the chamber 2 and opens through the lower end of the chamber 2 where it is provided with a valve seat 8. The valve 1 is provided with opposing balanced pressure faces 9, 10, of equal diameter or pressure area exposed in the chamber 2, and also with an unbalancing pressure face 11 presented in the chamber and subject to the pressure therein only when the valve is closed, the pressure on the unbalanced face 11 acting in such direction, as upward, to open the valve, assuming the applied operating force is less than the pressure of the fluid on the counterbalancing face 11. As soon as the valve opens, it will again close as the pressure on the unbalancing face is released by the opening of the valve, assuming the operating force continues to be applied.

The valve 1 is here illustrated as consisting of two axially alined sections or members 12, 13, one member 12 slidably fitting a guide 14 and projecting axially into the chamber 2 and being of less diameter than the chamber so that the pressure of the fluid in the chamber is effective to tend to shift or resist movement of the member 12 on the end face only of the member 12, that is, on the pressure face 9. The member 12 has a suitable oil seal packing 15 and is connected to the motion transmitting means between the thigh muscle control and the valve.

The guide 14 is a bore in a bushing 16 threading in the casing 3 in alinement with the valve chamber.

The valve member 13 projects in advance of the member 12 and includes a head as a ball 17 for coacting with the seat 8, the ball being connected to the member 12 by a stem 18 interlocked as by a head 19 in an axial recess 20 in the end of the member 12. The upper hemispherical face of the ball 17, less the cross sectional area of the stem 18, is the pressure face 10, and the pressure face 9 is equal to the pressure area of the end face of the member 12 less the cross sectional area of the stem 18. The pressure within the chamber 2 on the faces 9, 10, thus balance each other. A cushion 21 is located in the recess 20 behind the head 19 for a purpose to be presently brought out.

The valve seat 8 is of less diameter than the head or ball 17. Hence, when the ball is seated, there is a zone on the opposite or under side of the pressure ball 17. This zone constitutes the unbalancing pressure face 11 subject to the pressure within the chamber 2 when the valve is closed. The pressure against the unbalancing face 11 tends to open the valve against the applied operating force and acts to momentarily open the valve while the operating force is less than the pressure on the face 11. As soon as the valve opens, the pressure on the face 11 is released and the valve immediately closes. The momentary opening and closing continues until the ball 17 is firmly seated by the operating force overcoming the unbalancing pressure on the face 11. When the operating force is greater than the fluid pressure on the unbalancing face 11, the valve is held closed. The cushion 21 relieves the valve section 13 of undue compression when the valve head or ball 17 is firmly held by the operating force against its seat 8.

The control for the operating means includes a prime mover 25 carried at the upper edge of the stump socket 26 of the artificial leg in position to be actuated by the tensioning and relaxation of the quadricep muscle, and motion transmitting connections between the prime mover and the valve member 12.

The prime mover 25 is here shown as an angle lever pivoted at its angle at 27 to a bracket 28 fixed to the stump socket 26 on the front side thereof, and also usually a second lever 29 arranged to be actuated successively to the lever 25. One arm of the angle lever 25 extends upward, and the other arm forward to overhang the front side of the socket 26. The arms of the angle lever are adjustable relatively to each other about the pivot 27 to adjust the prime mover to the thigh muscles of the amputee. The adjustment is effected by a set screw 30. The forwardly extending arm of the lever 25 coacts with the motion transmitting connections to the valve member 12. The lever 29 is pivoted at 31 to the upwardly extending arm of the angle lever and extends forward therefrom and overhangs the forward arm of the angle lever 25. It is connected by a link 32 to the forward extending arm of the lever 25. The lever 25 is actuated during normal walking. The lever 29 is actuated successively to the lever 25 during operations such as sitting down, or standing up from sitting position, ascending or descending steps etc., or anytime when the stump is raised to a greater angle to the body than during normal walking.

The motion transmitting connections comprise a plunger 33 actuated by the lever 25 and a Bowden wire 34 between the plunger and the valve member 12, the plunger embodying yielding or spring means which permits opening of the valve when the pressure on the unbalancing face 11 is greater than the valve closing force through the spring.

As here shown, the yielding means, or spring, is embodied in the plunger. The plunger 33 is shown as consisting of two telescoping parts, one being a main body slidable in an adjustable bushing 35 threading into the bracket 28, the movement of the main body of the plunger being against a relatively stiff compression spring 36, and the other plunger part being a secondary plunger 37 slidable in an axial bore in the main body against a relatively light spring 38, and having a head located to receive motion from the prime mover lever 25 and coacting with the forward extending arm thereof or roller 39 thereon. The Bowden wire 34 is anchored at one end to the plunger 33, and at its other end to the valve member 12.

During the tensioning of the quadricep muscle, or thigh muscles, the prime mover lever 25 is actuated to depress the secondary plunger 37 against its spring 38, but some of this initial pressure is transferred to the main body of the plunger 33 slightly compressing, at a predetermined ratio, the stiff spring 36, thus actuating the Bowden wire and closing the valve from the position shown in Figure 3 to that shown in Figure 4, the secondary plunger 37 and the main body of the plunger 33 moving from the position shown in Figure 3 to that shown in Figure 4 wherein the stiff spring 36 is slightly compressed and where the light spring 38 of the secondary plunger is also almost fully compressed but subject to further compression, as shown by the space at S, Figure 4. During continued movement of the prime mover, the light spring 38 is further compressed. When the plunger parts and springs are in the position shown in Figure 4, with the spaces open, the stiff spring 36, which is interposed between the bushing and an annular shoulder at the upper end of the body of the plunger 33, is pushing upward and hence, the pressure on the unbalancing face 11 of the valve presses the main part 33 of the plunger upward to unseat the valve head 17 against the light spring 38. As before stated, when thus unseated it immediately seats, because the pressure on the unbalancing face 11 is immediately released. The pressure of the light spring 38 is less than the pressure normally applied to the unbalancing face 11 when the valve head 17 is closed. As the thigh muscles are further tensioned by the lifting of the leg, the secondary plunger 37 is moved downwardly to take up the space at S into the position shown in Figure 5 and hence, the pressure of the fluid in the valve chamber on the unbalancing face when the valve is closed is against the control lever 25 which is being held by the highly tensioned control, so that the pressure on the unbalancing face 11 is over-ruled and the valve is held firmly closed. When the valve is held firmly closed, the cushion 20 relieves the valve members of undue compression.

The knee lock is in the lower leg structure of the artificial leg. The cylinder 4 is shown as having a tail rod 41 pivoted at 42 to the ankle of the foot 43, and the rod 44 of the piston 5 is pivoted at 45 to a knee bracket 46 fixed to the lower end of the socket 26 eccentric to the knee joint pivot 47, about which the lower leg structure hinges.

It is here shown as connected to the foot by a tibia link 48 on each side of the lower leg structure. When the leg is extended, or straight, as shown, and no weight is applied to the leg, the thigh muscles exert no force on the prime mover 25. At any time when the amputee lifts the artificial leg, or swings the stump forward at the hip joint, the thigh muscles are tensioned actuating the prime mover 25 which causes the valve head 17 to momentarily seat, so that if the foot is placed on a walking surface while the knee joint is flexed, the leg will not buckle at the knee joint. As the walking operation, or the control thereof, forms no part of this invention except as a control valve applicable for controlling the hydraulic fluid of the knee lock, it is thought unnecessary to go into the technique of the walking cycle of the artificial leg.

During the walking cycle, or flexing at the knee joint, the piston 5 is pulled upward in the cylinder creating a pressure above the piston through the leg 6 of the by-pass into the chamber 2. The tensioning of the thigh muscles causes the valve head 17 to seat, but it can move off its seat, or fluctuate, or throttle, permitting fluid to flow through the by-pass to the lower side of the piston until the quadriceps are tensioned further, or to their full extent and hence, no throttling, or no passing of the oil through the by-pass takes place. The thigh muscles are operated for the most part unconsciously. The pressure is downward on the fluid below the piston only while the leg is extending, or straightening, under the pull of a returning spring 49. At this time, any displacement of the fluid is upward through the leg 7 past the open valve head 17. The valve head 17 may, in some situations, as when in closed position owing to partial tensioning of the quadriceps and the pressure on the fluid below the piston 5 is downward, open as a check valve by the upward pressure through the leg 7 of the by-pass into the valve chamber 2. In the application of this valve as illustrated, or in any other adaptation thereof, the valve acts as a throttling valve to fluctuate or open under a pressure applied to its unbalancing face, as long as the force of such pressure on such face is greater than the force applied through yielding means tending to hold the valve closed.

What I claim is:

A throttle valve including a body formed with passages through which a fluid passes in either direction, and a valve chamber connecting said passages, a valve in the chamber and movable in opposite directions to closed and open positions and operating means for the valve operable to close the valve upon the initial closing movement of the operating means, a spring embodied in the operating means to yieldingly retard the operation of the valve to closed position, the valve including two axially alined members, to one of which the operating force is applied, the second member extending axially in advance of the former member and having a head movable into and out of closed position, cushioning means between said members, said members being provided with opposing balanced pressure faces presented to the fluid in the chamber, and an unbalancing pressure face on the head exposed on the interior of the chamber to the pressure therein when the head is closed to receive pressure to open the valve against the spring of the operating means when the force of the spring of the operating means is less than the pressure applied to the unbalancing face when the valve is closed.

JOHN G. CATRANIS.

REFERENCES CITED

The following references are of record in the file of this patent:

UNITED STATES PATENTS

| Number | Name | Date |
| --- | --- | --- |
| 480,528 | Thoms | Aug. 9, 1892 |
| 905,181 | Hedges | Dec. 1, 1908 |
| 1,175,253 | Fulton | Mar. 14, 1916 |
| 1,493,774 | Dorsey | May 13, 1924 |
| 2,251,383 | Thomas | Aug. 5, 1941 |

FOREIGN PATENTS

| Number | Country | Date |
| --- | --- | --- |
| 527,919 | Great Britain | Oct. 18, 1940 |